United States Patent
Murokh

(10) Patent No.: US 9,517,855 B2
(45) Date of Patent: Dec. 13, 2016

(54) LASER CAPSULE MARKING SYSTEM AND METHOD

(71) Applicant: Tri-Star Technologies, El Segundo, CA (US)

(72) Inventor: Igor Murokh, Santa Monica, CA (US)

(73) Assignee: Tri-Star Technologies, El Segundo, CA (US)

( * ) Notice: Subject to any disclaimer, the term of this patent is extended or adjusted under 35 U.S.C. 154(b) by 340 days.

(21) Appl. No.: 14/154,913

(22) Filed: Jan. 14, 2014

(65) Prior Publication Data

US 2014/0123601 A1    May 8, 2014

Related U.S. Application Data

(63) Continuation of application No. PCT/US2012/055825, filed on Sep. 17, 2012.
(Continued)

(51) Int. Cl.
*B65B 61/02* (2006.01)
*B41J 2/44* (2006.01)
(Continued)

(52) U.S. Cl.
CPC .............. *B65B 61/025* (2013.01); *A61J 3/07* (2013.01); *B23K 26/0006* (2013.01);
(Continued)

(58) Field of Classification Search
CPC ... B23K 26/362; B23K 26/0673; B29C 31/02; B65B 61/025
(Continued)

(56) References Cited

U.S. PATENT DOCUMENTS 2,363,014 A  *  11/1944  Alexandre .............. B65B 11/50
                                                               221/68
3,849,714 A  *  11/1974  Goretzki ................... H02P 8/24
                                                              318/685
(Continued)

FOREIGN PATENT DOCUMENTS

EP        0915014 A1    5/1999
JP        52120093 A    10/1977
(Continued)

OTHER PUBLICATIONS

International Search Report and Written Opinion in International Application No. PCT/US2012/055825, published as International Publication No. WO 2013/040599, which is the parent to the present U.S. continuation application.

*Primary Examiner* — Matthew Daniels
(74) *Attorney, Agent, or Firm* — Lance M. Pritikin

(57) ABSTRACT

A laser capsule marking system and method may comprise at least two indexing wheels, a feeding mechanism, a laser marker, a first inspection system, a rejection subsystem, a reject verification sensor, and a collection device. The wheels are coaxial and have respective circumferential peripheries with multiple open pockets distributed thereabout. Each pocket is configured to releasably receive a pharmaceutical capsule doped with pigment particles reactive to laser light. The indexing wheels are configured to be incrementally rotated in alternating indexing fashion for transporting discrete arrays of respective pockets through a loading zone, an inspection zone, a marking zone, a reject zone, and an unloading zone. An actuatable reject block may be provided to simultaneously blow a rejected capsule from its pocket, and draw it in for transport to a rejection bin. Each
(Continued)

circumferential periphery may be comprised of multiple arcuate shoes removably and replaceably secured to their respective indexing wheel.

15 Claims, 3 Drawing Sheets

Related U.S. Application Data

(60) Provisional application No. 61/535,887, filed on Sep. 16, 2011.

(51) Int. Cl.

| | | |
|---|---|---|
| *B41J 3/407* | (2006.01) | |
| *B23K 26/00* | (2014.01) | |
| *B23K 26/03* | (2006.01) | |
| *B23K 26/08* | (2014.01) | |
| *B41M 5/24* | (2006.01) | |
| *A61J 3/07* | (2006.01) | |
| *B65B 57/00* | (2006.01) | |
| *B65B 61/26* | (2006.01) | |

(52) U.S. Cl.
CPC ........ *B23K 26/0084* (2013.01); *B23K 26/032* (2013.01); *B23K 26/0622* (2015.10); *B23K 26/082* (2015.10); *B23K 26/0823* (2013.01); *B23K 26/364* (2015.10); *B41J 2/442* (2013.01); *B41J 3/407* (2013.01); *B41M 5/24* (2013.01); *B65B 57/00* (2013.01); *B65B 61/26* (2013.01)

(58) Field of Classification Search
USPC ........................................ 219/121.82, 121.71
See application file for complete search history.

(56) References Cited

U.S. PATENT DOCUMENTS

| | | | |
|---|---|---|---|
| 4,088,864 A | | 5/1978 | Theeuwes et al. |
| 4,104,966 A | | 8/1978 | Ackley, Jr. et al. |
| 4,500,012 A | | 2/1985 | Ackley |
| 4,964,262 A | * | 10/1990 | Moser .................... A61J 3/074 53/506 |
| 5,033,251 A | * | 7/1991 | Rodriguez ............ B07C 5/3404 209/936 |
| 5,073,379 A | * | 12/1991 | Klimesch ................. A61J 3/10 424/400 |
| 5,442,892 A | * | 8/1995 | Burns, III ............... B65B 69/00 53/453 |
| 6,296,123 B1 | * | 10/2001 | Zakeri ................... B07C 5/3408 209/522 |
| 6,429,889 B1 | | 8/2002 | Murokh |
| 6,452,133 B1 | * | 9/2002 | Geerke ................ A61K 9/0004 219/121.71 |
| 6,836,284 B2 | | 12/2004 | Murokh et al. |
| 2006/0102608 A1 | * | 5/2006 | Katsuta .................. B23K 26/03 219/121.83 |
| 2007/0194034 A1 | | 8/2007 | Vasiadis |

FOREIGN PATENT DOCUMENTS

| | | |
|---|---|---|
| JP | 01056549 A | 3/1989 |
| JP | 06143539 A | 5/1994 |
| JP | 09-187915 A | 7/1997 |
| JP | 2001033392 A | 2/2001 |
| JP | 2001106337 A | 4/2001 |
| JP | 2002186912 A | 7/2002 |
| JP | 2005-125000 A | 5/2005 |
| JP | 2008126309 A | 6/2008 |
| JP | 2011025461 A | 2/2011 |
| WO | 9101884 A1 | 2/1991 |
| WO | 0107198 A1 | 2/2001 |
| WO | 2006126561 | 11/2006 |

* cited by examiner

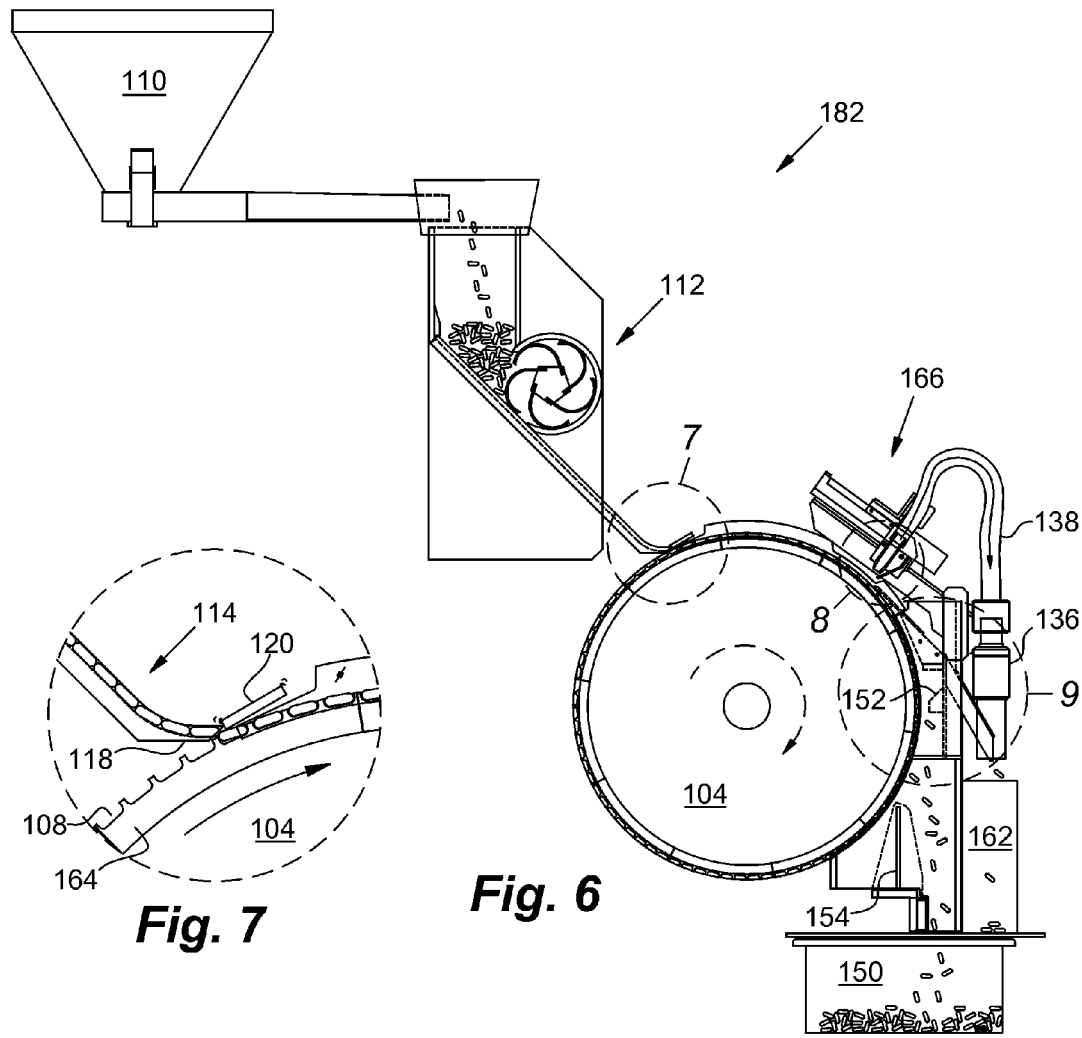
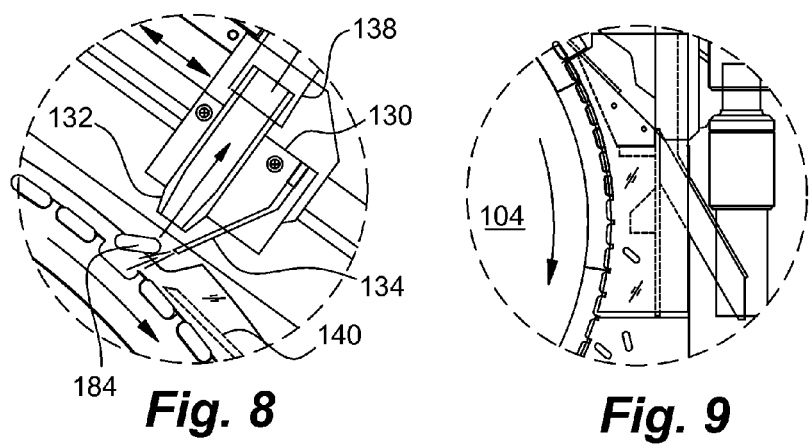
Fig. 7    Fig. 6
Fig. 8    Fig. 9

LASER CAPSULE MARKING SYSTEM AND METHOD

RELATED APPLICATIONS

This application is a bypass continuation of International Application No. PCT/US2012/055825 filed on Sep. 17, 2012, which claims the benefit of U.S. Provisional Application No. 61/535,887 filed on Sep. 16, 2011, the contents of each of which are incorporated by this reference in their entirety for all purposes as if fully set forth herein.

TECHNICAL FIELD

The present invention relates generally to the rapid marking of small, individualized articles. More particularly, the invention relates to a system and method for high-production laser marking of capsules consumable by humans for therapeutic purposes, while ensuring the quality of the marked capsules produced.

BACKGROUND

The pharmaceutical industry maintains stringent requirements for the marking and handling of medicinal capsules. What is needed is a pharmaceutical capsule marking system which provides for more accurate and efficient marking of capsules as compared to conventionally-used capsule marking processes, while simultaneously maintaining the requisite degree of quality control and quality assurance.

SUMMARY

Certain deficiencies of the prior art may be overcome by the provision of a system and method for laser marking of individual consumable articles. Embodiments of the system may comprise at least two indexing wheels, a feeding mechanism, a laser marker device, a first inspection system, a rejection subsystem, a reject verification sensor, and a collection device. The indexing wheels are preferably substantially coaxial and have respective circumferential peripheries with a multiplicity of open pockets distributed thereabout. Each pocket is configured to releasably receive an individual consumable article, such as a pharmaceutical capsule, for substantially stabilized transport of that article with the respective pocket. The indexing wheels are typically configured to be incrementally rotated in alternating indexing fashion for transporting discrete arrays of respective pockets through at least a loading zone, a first inspection zone, a marking zone, a reject zone, and an unloading zone. Each indexing wheel is typically paused between respective incremental rotations.

The feeding mechanism may take various forms, at least one preferred such form being specifically discussed herein. Generally speaking, the feeding mechanism is configured to feed one articles into each pocket as the pocket is being transported through the loading zone. The laser marker device is provided for marking the articles as they reside in respective pockets positioned within the marking zone. Preferably, such marking takes place while the respective indexing wheel is paused. The first camera is used to inspect the articles which have been marked within the marking zone to ensure proper marking. Based on such inspection, the system identifies the respective article as either accepted or rejected. The rejection subsystem is provided for removing each of the rejected articles from respective pockets within the reject zone. The reject verification sensor allows the system to verify that each of the rejected articles have been removed from their respective pockets. A collection device, such as a collection bin and associated article guiding structures, is configured to receive articles from the unloading zone which have been marked by the laser marker device and identified by the system's processing as accepted.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 6 is a diagrammatic side view illustrating the primary transport components of a preferred embodiment;

FIG. 7 is an enlarged view of detail 7 in FIG. 6;

FIG. 8 is an enlarged view of detail 8 in FIG. 6; and

FIG. 9 is an enlarged view of detail 9 in FIG. 6.

DETAILED DESCRIPTION OF THE PREFERRED EMBODIMENTS

Figure 1:
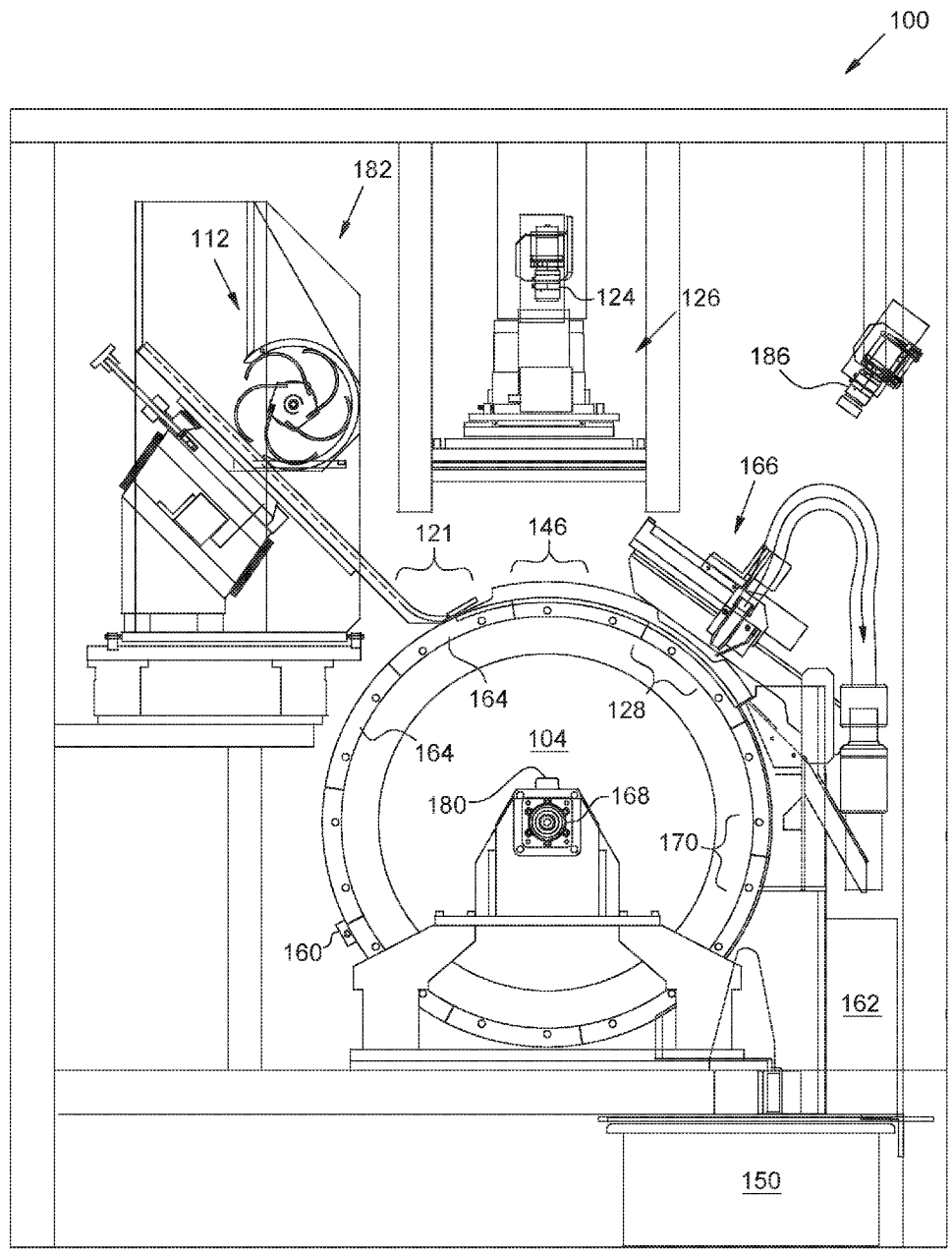
FIG. 1 is a diagrammatic side view of one embodiment of a system in accordance with the present invention.

Referring now to the drawings, like reference numerals designate identical or corresponding features throughout the several views.

Preferred embodiments described herein involve an ultraviolet laser marker which is a standalone capsule marking system capable of a production rate of between 50,000-100,000 capsules per hour. The production rate may be at least partially dependent upon the size of the capsule to be marked. Such preferred embodiments may be specifically designed for pharmaceutical industry in compliance with all applicable standards.

In one or more preferred embodiments, the marking process is based on UV laser irradiation of capsules containing TiO2 pigment (e.g, Cold Laser™ Technology). In such systems, short (<50 nsec) laser pulses with a wavelength below 400 nm cause distinct darkening of exposed areas when originally white TiO2 particles turn silver/black. Most of the laser radiation does not react with primary material and freely goes through the substrate surface. Pigment particles distributed in the bulk strongly absorb the beam. The absorbed energy either modifies the pigment structure and appearance including the color, modifies the structure and appearance of material immediately surrounding the pigment particles, or modifies the appearance of the interface between the pigment particles and the surrounding materials. This practically irreversible change provides both chemical and mechanical permanency to the mark. Due to the strong absorption most of the beam energy dissipates within a few surface layers. Thus, only a small fraction of pigment particles (~1%) are involved. A typical concentration of additives may be about 2-3 wt %, therefore the total amount of modified material in the substrate is extremely low (~0.03%). The depth of marking is inversely proportional to the concentration of additives and usually does not exceed 25 mm. Very short duration of laser pulses prevent regular heat exchange between the additives and surrounding material and limit any structural and/or chemical modifications only to the pigment particles themselves.

Preferred embodiments of the present invention may be equipped with a beam delivery system that allows printing full range of messages and graphics. Such embodiments may be fully programmable PLC driven systems controlled through the user friendly Touch Screen Display (HMI). The program routines may include manual and calibration modes as well as self-diagnostics to identify malfunctions. When malfunctions occur, the program is preferably configured to automatically stop the marking process and provide suggestions for troubleshooting.

Certain preferred embodiments may contain many internal and external interlocks to assure safe operating conditions. The laser beam may be completely enclosed within a steel cabinet. The system may be configured to shut off the laser automatically when the door of the cabinet is open. However, some service and maintenance work, including installation and calibration procedures, may require access to the laser generator and other optical components of certain embodiments of the system. Preferably, the unenclosed beam of the laser or laser system should be contained within a specified region by adequate control measures. Consideration should be given to direct, reflected and scattered radiation in the establishment of the boundaries for the laser controlled area.

Particular preferred embodiments of the system may consists of one or more of the following: an unmarked capsules container (e.g., hopper 110), an automatic capsules feeder, an automatic capsules orientation and positioning system (e.g., indexing wheels 104 and 106), a marking device (e.g., a 355 nm laser and scanner), a device for marking quality verification (e.g., first inspection camera 124), a rejection system for removal and sequestration of capsules with inappropriate marking, a device for reject verification (e.g., second inspection camera 186), an automatic offloading system (e.g., blow-off air jets 152 and 154), one or more marked capsules containers (e.g., collection bins 150), control electronics including at least one PLC, and an operator workstation with an HMI. The at least one PLC synchronizes all processes, triggers the laser pulses, reads and analyses signals from the sensors and cameras, and controls and drives the indexers.

In one exemplary embodiment of the system and method, the capsules 102 stored in the hopper 110 are loaded through the feeding mechanism into the indexing drums (e.g., indexing wheels 104 and 106). There are two drums with predefined cells (i.e., pockets 108) for capsule positioning. Each drum may have, for example, three circumferentially-extending rows of identical cells. The drums may, for example, index arrays of 12 capsules from one zone to another every 1.8 seconds. In such embodiments, during the first 0.9 seconds the drum moves loaded capsules to the next zone and loads 12 new capsules into the empty cells. During the next 0.9 seconds the drum is not moving, the laser system marks 12 capsules in the marking zone, the inspection system analyses 12 capsules in the inspection zone, and the rejection system removes bad quality capsules from the drum in the rejection zone. The drums' movement is synchronized so that first drum completes the index within 0.9 sec while another drum is at rest, and vice versa. Marking, inspection and rejection stations work continuously, switching every 0.9 sec from one drum to another. That can result in total throughput of 50,000 or more capsules per hour.

In preferred embodiments, assemblies are mounted inside a metal cabinet on a massive frame that provides rigidity and prevents misalignment of the optical system. In proper operational condition, all laser radiation is preferably completely enclosed inside the cabinet in compliance with laser safety standards (e.g., ANSI Z136.1-1993). The system may have a number of internal locking devices, which automatically shut down the laser and if any of the covers are open.

Certain preferred embodiments use a hopper system to feed individual capsules to the indexing wheels. In such embodiments, the capsules may fall from a hopper tray into a feeder 182. The PLC may be configured to stop the hopper when the capsules in the feeder reservoir reach a certain volume defined by, for example, a level sensor. Maintaining a constant volume/weight in the reservoir results in a steady gravity assisted movement of capsules through the feed channels 114. Vibration may preferably be used to prevent the capsules 102 from sticking to each other and to the walls of the feeder system. Rotating flaps 112 may be provided to agitate the capsules in the reservoir, thereby preventing the agglomeration and assisting the loading into the channels. The amplitude of vibration and speed of rotation are typically programmable and can be changed depending on the throughput, size, weight and hardness of the capsules. Generally, conveying softer capsules requires stronger vibration and faster flap rotation. The feeder track may include a multiplicity of individual channels sized to accommodate specific capsules but can easily be replaced to another track adapted to handle capsules with different dimensions.

In respective embodiments, the straight channels 114 end with a transfer block consisting of a transfer tip 118 attached to the track from the bottom and a dancing plate 120. The transfer tip 118 is preferably configured to provide almost tangential entry of the capsules into the pockets on the indexing wheel. The precise tip positioning with respect to the indexing wheels may be adjusted to ensure reliable loading and may largely depend on the specific capsule/pocket configuration and indexing speed. The fall of capsules into the pockets may be synchronized with the wheel movement using the dancing plate 120. In such embodiments, the dancing plate halts the capsule flow when the respective indexing wheel stops, restricts the entry speed when the wheel moves, and compensates for loading force fluctuations caused by irregularities of vibrations inside the channels and also by slight variations in capsule sizes and hardness.

In one exemplary embodiment of the system and method, the wheel/index assembly may consist of two indexing wheels mounted on the shafts of, for example, heavy duty 5 phase stepper motors 168. The indexing wheel may be substantially comprised of Aluminum. The motors may be connected to drivers located in an electronic control box. The indexing wheel diameter may preferably be, for example, approximately or substantially 60 cm. Each wheel may include, for example, 10 plastic shoes 164 with 3 rows of identical pockets/cells to accommodate capsules of specific dimensions. The wheels may preferably be adapted to rotate 18 degrees per index to correspond to 12 cells. The capsule loading and unloading may preferably occur when the respective wheel is moving while the marking, inspection, and rejection may preferably be performed in stationary mode. The alternating rotation of the indexing wheels are synchronized to allow substantially continuous laser marking. The number of steps per index as well as motor acceleration and deceleration are preferably programmable and selected to meet the system throughput requirements. The motors 168 may be equipped with encoders to confirm every move of the respective wheel, and the system is preferably configured to alarm if the motor cannot reach the required position.

Figure 2:
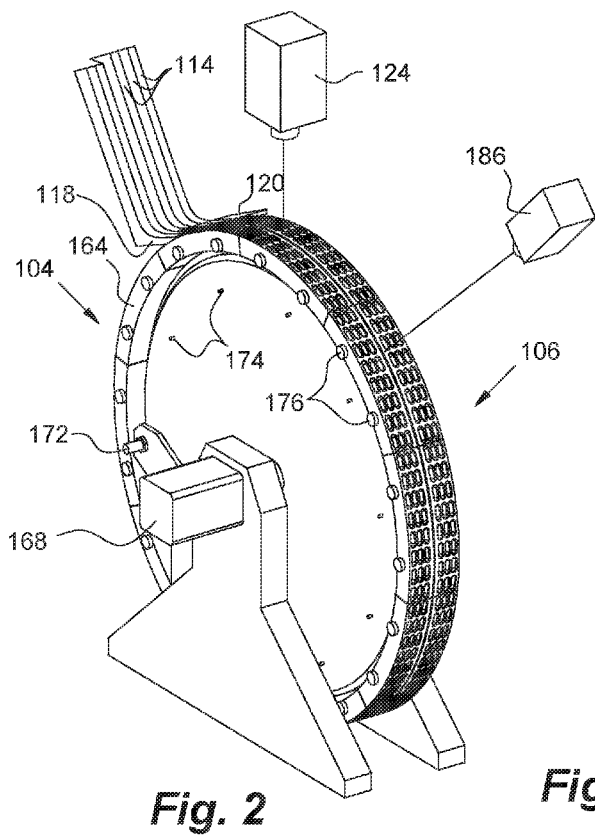
FIG. 2 is a diagrammatic perspective view of indexing wheels and associated elements in accordance with a preferred embodiment.

In certain preferred embodiments, the wheels come to their home position every time the system is turned on. The home position is a precisely defined number of encoder pulses triggered by the signal from a proximity sensor 172. Referring to FIG. 2 for illustration, there may be, for example, 10 pins/home positions 174 per revolution, or one per each shoe. Such a configuration allows the system to find a home position for the respective wheel within two indexes. All the capsules entering the rejection zone during the home positioning process are preferably rejected.

Each wheel may be mounted on a respective steel rod and locked into position with, for example, locking screws. The entire assembly can preferably be easily moved out and taken apart for cleaning and/or replacement of the components. High contrast permanently attached yellow rulers, for example, may provide reference points to return the assembly back into the working position. The shoes may be removable and interchangeable for easy cleaning or replacement.

In preferred embodiments, most of the capsules exiting from the transfer block would be properly loaded into the pockets. Some capsules, however, may not get into respective pockets on time and may become floaters. Floaters are a concern because they may travel with the wheel and disturb marking, inspection and counting processes. Thus, in preferred embodiments, one or more the inspection cameras may be configured to identify floaters to facilitate their rejection, or trigger an alarm or machine stoppage. In embodiments, loose and undetected floaters end up on top of a separation plate and fall through a U-channel into the rejection bin. A reflection sensor or the like may be provided to trigger the stops the marking process when reject bin is full.

The system may be configured so that properly marked capsules move under the separation plate 140 into a collection channel where precisely directed air jets blow them out of their pockets. In certain preferred embodiments, the properly marked capsules are propelled away from their respective pockets by one or more sets of air streams. For example, one or more blow-off modules (e.g., 152 and 154) may each comprise a six-nozzle manifold connected through separate flow controls to a single solenoid valve that opens whenever the wheels are moving. At normal conditions when capsules are relatively dry, air may flow from, for example, 15 to 30 lpm, which has been found to be quite sufficient for effective capsule removal. When capsules are more oily they tend to stick to the surface of the pockets and, and may therefore require stronger air streams to blow them out of their respective pockets. Accordingly, the strength of the blow-off air streams may be preferably adjustable by way of, for example, the HMI.

Particular embodiments may comprise two blow-off assemblies. The first one may comprise the separation plate, U-channel, and air-jet-1 manifold sandwiched between the side walls made of transparent plastic. The second may comprise the collection channel with air-jet-2 manifold. The blow-off assemblies may be affixed to holding brackets mounted to the system frame. One or more components of each blow-off assembly may be configured to be easily removed from the frame and taken apart for cleaning High contrast permanently attached yellow rulers, or the like, may provide reference points to re-affix the assemblies back into their original working position.

Referring to FIG. 1 for illustration, one or more preferred embodiments may comprise a blow off verification sensor 160 placed, for example, after the one or more sets of blow-off jets 152 and 154. The path of a see-through beam may be adapted to lay across the two indexing wheels in extremely close proximity to the radially outermost surfaces of the wheels. Since typically a capsule sitting within a pocket extends slightly outward of the respective pocket, any capsule which remains in a pocket following the blow-off jets would block the beam. Such blockage would cause the blow-off verification sensor to send a signal triggering a stoppage of the machine. The detected capsule may then be manually removed from the pocket. A large inclined mirror may be placed beside the wheels to assist an operator in locating and manually removing the stuck capsule. Detached capsules fall may then into a drop bin under the wheels.

Once the properly-marked capsules are removed from their respective pockets, the capsules may then fall into the collection bin, positioned below the indexing wheels. A clear plastic cover on top of the collection bin may be provided to prevents capsules from bouncing out. The collection bin may preferably rest on, for example, a precision scale with an output connected to the PLC. The weight of product in the collection bin is preferably shown on the HMI screen and scale display in real time. The system may be configured to provide a warning (e.g., a yellow beacon on a status light) when the collection bin weight reaches a particular weight threshold, for example, 9 Kg. The system may be further adapted to come to a complete stop, and may trigger a red beacon and audible alarm, when the collection bin weight reaches a weight limit threshold, for example, 10 kg.

The laser marker device may preferably be based on UV Cold Laser® Technology inducing the color change on the surface of capsules doped with titanium dioxide pigment. However, analogous marker and capsule doping combinations may be used where appropriate and preferable. The exemplary embodiment referred to herein is equipped with a pulsed solid state Nd:YLF laser that generates up to 180 uJ of UV radiation per pulse at the 5 KHz repetition rate. The pulse duration is less than 15 nsec. The fundamental harmonic emitted in the Infra-Red region of the spectrum (1064 nm) is transformed into Ultra-Violet wavelength of 355 nm by the optical frequency conversion system. Alternative embodiments may employ an Nd:YAG or Nd:YVO$_4$ laser.

A Power supply may be directly connected to a source of 220 VAC, and to the PLC through a serial port. The laser may be adapted to turn off when an emergency stop button is hit and/or laser cabinet door is open. The gate signal from the scanner turns the Laser Q-Switch on and off in synch with the movement of the scanner mirrors.

In exemplary embodiments, a two dimensional scanner is capable of printing any alphanumerical message and/or graphic image in the flat field of up to 10 cm by 10 cm. In particular embodiments, deflection mirrors scan the laser beam according to a specified pattern similarly to a hand writing process. 200 mm objective focuses the beam on the capsule surface. The laser fires 5000 shots per second leaving one permanent marking dot on the surface per shot. The dot diameter varies from about 100 to 200 um and mostly depends on the laser pulse energy, focusing objective, and surface composition. The distance between the dots is completely programmable and depends on the speed of the moving mirrors and laser repetition rate. The speed and trajectory is fully programmable allowing user to imprint any information on the capsule surface including logos, pictures, barcodes, and alpha numeric messages. With such a configuration, an exemplary embodiment of the system may be optimized for marking approximately 50,000 capsules per hour with the inscription "AB 123" having a marking height and length of 2 mm and 9 mm, respectively.

The laser system may be comprised of a laser head mounted on a solid aluminum plate and connected to the power supply with 600u diode pump optical fiber and power cable. Head alignment may be adjustable for alignment purposes during initial setup and replacement procedures.

Optimized for a high speed marking, software is provided to transform the required printing information into the set of command downloaded into a control board that controls both the scanner and the laser. The mirror movements are preferably defined by the PLT vector file which is transferred and stored in real-time clock (RTC) memory. The laser pulses are triggered through the gate input. The laser is fired with predetermined repetition rate when the mirrors are moving from one point to another along the making line and is not firing when the mirrors jump through the blank space to another marking line. After each capsule is marked, the PLC receives a signal from the scanner. Before marking in each position the scanner checks for permission from the PLC verifying a capsule is determined to be present in the respective pocket. The scanner deactivates the laser (e.g., turns on the gate signal) during the path over an empty pocket. In embodiments, after finishing the marking sequence, the scanner sends a signal to PLC and receives the permission to mark at the next position and so on.

The system preferably includes a built-in pulse energy meter. The pulse energy may be checked automatically at the start up and also at the intervals set by the end user (e.g. every hour and/or shift). The limit thresholds are programmable (e.g., +/−5% of the specified value). If the measured energy falls out of range, the laser power setting may be adjusted to restore specified output energy. If specified energy cannot be achieved the production will stop and a pulse energy error will preferably appear on the operator's screen. In such an event, the system may also be configured to activate a notification light on, for example, a signal tower, and an audible alarm.

The marking pattern on each capsule is analyzed by optical recognition/inspection system. The system compares the current marking with a specified pattern, produces an alarm and rejects the capsule if one of the checking parameters is out of range. Marking quality may be analyzed using a high-definition (e.g., 1600×1200 pixels) grayscale camera connected to an associated processor. Illumination lights for the inspection zone are also typically provided. In particular preferred embodiments, the inspection zone is collocation with the marking zone or field. The imprints on the capsules in the middle and at the edge of the field are slightly different from each other due to different distances from the objective to the capsule surface and aberration of the objective lens. In addition the illumination of a large marking field is typically not quite uniform. These variations, practically invisible for a naked eye, are easily detected by the high definition camera. Therefore the marking on each capsule should be compared with its individual pattern specified for each position.

All basic pass/fail criteria are adjusted based on actual runs of the system during qualification procedures. Unlike the traditional ways of marking with the contrast layer of color ink placed on the capsule surface the grey color UV laser marks are distributed in the 10-20 um deep surface layer. That creates an indelible high resolution inscription but requires special analyzing software tools due to the absence of a sharp border between the marks and background. Imposing tight margins on the pass/fail parameters would cause erroneous rejections of otherwise legitimate markings, while excessively loose tolerances would allow the defectively-marked capsules to slip by.

In operation of the exemplary embodiments, the first inspection camera takes picture every 0.9 sec. or so at the short instance when both indexing wheels are not moving. That happens when one wheel completes the index and stops for the marking while the laser completes the marking on another wheel that is still stationary but ready to move. The first is triggered when the capsules on the top wheel just arrived into the marking position while capsules on the bottom have just been marked. An image processor determines the position of each unoccupied pocket on the top wheel. PLC then turns off the laser beam during the path over those empty pockets. The empty pocket map is also used later to check the consistency between the inspection and rejection cameras.

Once the respective array of pockets on the top wheel is inspected the marking process begins, and the bottom wheel starts moving. During this time the processor analyzes the marking of the capsules in the respective pocket array on the bottom wheel and transfers the information to the PLC that activates the rejection system if a capsule with unacceptable marking is found. The next image is taken when the capsules on the bottom wheel just arrived into the marking position while capsules on the top have just been marked. The processor then determines capsule presence on the bottom and analyzes marking on the top, and so on. The terms "top" wheel and "bottom" wheel are used herein to describe only the orientation of images displayed on a video monitor, where such images relate to a respective indexing wheel in a two-wheel system.

The data collected by the inspection system are also used for process monitoring. For example, the excessive number of empty pockets in any particular row may indicate a problem with corresponding feeding channel, repeatable failure in most of the marking positions may indicate low laser energy, repeatable failure in any particular marking position indicates a specific defect in optics, etc.

The rejection subsystem may comprise one or more of a reject block mounted on a motorized XY positioning stage (166), a vacuum ejector 136, a second inspection camera 186 for reject confirmation, a reject zone illumination light, and a reject bin 162 with bin full sensor. Rejection may be confirmed using the second inspection camera, which may also preferably be a high-resolution grayscale camera connected to an associated processor.

A reject block 130 may comprise an eject nozzle 132 and a pilot nozzle 134. The eject nozzle may be connected to the vacuum ejector 136 by way of a capsule conveying flexible 25 mm internal diameter hose 138 or equivalent. Based on Bernoulli's Principle the vacuum ejector 136 creates a suction at the nozzle end when a stream of compressed air expands inside the ejector body. In certain embodiments, the ejector and pilot nozzle may be connected directly to a compressed air supply. The applied pressure may be, for example, set by an air pressure regulator, measured by an analog pressure meter and displayed on the HMI screen and reject gage. A solenoid valve may be configured to open and close the air supply line when needed. The duration and pressure of the compressed air burst are preferably programmable. The system may be configured to alarm if the reject pressure is out of range.

In exemplary embodiments, there may be for example 24 capsules positioned in the reject zone (e.g., 12 per wheel). When a certain capsule needs to be rejected the XY stage 166 is configured to bring the reject block 130 from a home position into the specified position approximately, for example, 1 cm above the respective capsule. The solenoid valve opens, the pilot jet forces the capsule to leave the pocket, the ejector pulls the loose capsule in and conveys it into the reject bin. In rare event of insufficient suction the removed capsule may fall back from the reject nozzle. If the nozzle is moving across the wheels at the time, the capsule will drop onto the separation plate and fall into the reject bin. If the nozzle is in home position at the time, the capsule will fall into the drop out tube.

In preferred embodiments, at every index the system determines via the first inspection camera 124 which capsules in the respective pocket array have to be rejected and which pockets are empty. When that pocket array subsequently arrives at the reject zone the system compares the image taken via the second inspection camera 186 to the capsule presence information received via the first inspection camera image. If any discrepancies are found, the PLC stops the process, displays a camera malfunction alarm and indicates the corresponding suspect capsule positions on the wheel. Such a fault can be caused, for example, by improper calibration of the cameras or by actual jumping of the capsules from one pocket to another during the indexing. When the fault is cleared the capsules with specified marking defects are pulled out of their pockets and sent to the reject bin. The second inspection camera then makes the second shot confirming the capsule removal. If at least one of the defective capsules is still in place the reject cycle repeats. If a floating capsule falls into an empty pocket during the reject sequence it will be treated as defective and removed. The system stops and displays an error message when the reject fails after programmable number of attempts.

Upon successful completion of the rejection cycle PLC compares the capsule presence maps from the first and last images taken by the second inspection camera during the cycle and increments the capsule counts. The capsules remaining in their pockets are added as accepted. The capsules removed from their pockets are added as rejected.

In preferred embodiments, an operator workstation may comprise, for example, an IBM compatible computer with a keyboard and monitor, HMI panel, and KVM switch. The computer may be optionally configured to the customer's specifications, and may be connected to the remainder of the system through RS-232 input ports. In various embodiments, the operator can input information to the computer using one or more of a keyboard, auxiliary serial port, disk drive or LAN. During normal operations the computer monitor may principally display images of the current capsule marking received via the first inspection camera and related data processing.

Figure 3:
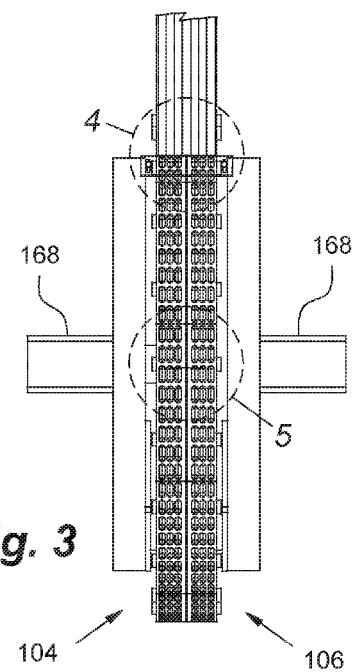
FIG. 3 is a diagrammatic top view of the subsystem shown in FIG. 2.

Embodiments of a system 100 for laser marking of individual consumable articles generally comprise at least two indexing wheels 104 and 106, a feeding mechanism 182, a laser marker device 126, a first inspection system 124 (such as a first camera), a rejection subsystem, a reject verification sensor, and a collection device 150. Referring to FIGS. 2 and 3 for illustration, the indexing wheels 104 and 106 are typically substantially coaxial and have respective circumferential peripheries with a multiplicity of open pockets 108 distributed thereabout. Each pocket 108 may be configured to releasably receive an individual consumable article 102, such as a pharmaceutical capsule, for substantially stabilized transport of the article 102 with the respective pocket 108. The indexing wheels are preferably configured to be incrementally rotated in alternating indexing fashion for transporting discrete arrays of respective pockets (see, for example, 178 in FIG. 5) through at least a loading zone 121, a marking zone 146, a first inspection zone, a reject zone 128, and an unloading zone 170. Each indexing wheel is preferably paused between respective incremental rotations. In particular embodiments, the marking zone and first inspection zone may be substantially or entirely collocated.

The feeding mechanism is preferably configured to feed one of the articles 102 into each pocket 108 transported through the loading zone 121. The laser marker device 126 is provided for marking the articles 102 in respective pockets 108 positioned within the marking zone 146 while the respective indexing wheel is paused. Articles that have been marked within the marking zone 146 may be inspected for proper marking and identified as either accepted or rejected by way of the first camera 124. The rejection subsystem is provided for removing each of the rejected articles from respective pockets within the reject zone 128. The reject verification sensor may be preferably provided for verifying the removing of each rejected article. The collection device, such as the collection bin shown at 150, is typically configured to receive articles from the unloading zone 170 which have been marked by the laser marker device 126 and identified as accepted. In preferred embodiments, the articles may be a pharmaceutical capsules such as, for example, softgels, coated pills, or the like. In such embodiments, at least an outer layer of each said capsule typically includes an additive which absorbs laser light to result in a color change.

In certain embodiments, each circumferential periphery is comprised of a multiplicity of arcuate shoes 164. Each such shoe may be removably and replaceably secured to its respective indexing wheel (e.g., 104 or 106). The shoes 164 may preferably be made substantially of a medical grade polymer, such as, for example, white acetal resin, or the like.

Referring to FIGS. 2 and 3 for illustration, preferred embodiments generally comprise one or more stepper motors 168. In such embodiments, the incremental rotations of the indexing wheels are adapted to be performed by way of these stepper motors. Particular embodiments may be configured such that each incremental rotation may be through approximately 16-18 degrees. This may be readily adjustable however, so that the system can be reconfigured to accommodate the marking of, for example, different sized capsules.

Figure 5:
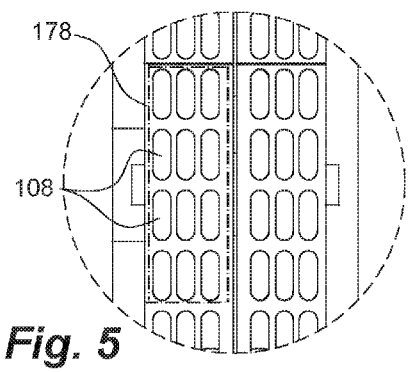
FIG. 5 is an enlarged view of detail 5 in FIG. 3.

Depending upon the particular embodiments of the system 100, each discrete array may consists of a group of pockets arranged, for example, in a rectangular array. Referring to FIG. 5 for illustration, each pocket array 178 in a particular preferred embodiment may consist of 12 pockets in a 3 by 4 arrangement.

In certain preferred embodiments of the system 100, the rates of rotational acceleration and rotational deceleration for each or all indexing wheels may be readily re-programmable, for example, by way of a operator-friendly human machine interface (HMI).

Particular preferred embodiments comprise an empty pocket presence sensor for detecting empty pockets within, for example, each pocket array 178. In such embodiments, the control logic of the system 100 is adapted to prevent the laser marker device 126 from directing marking energy into any empty pockets while marking articles 102 present within the respective array 178. The empty pocket presence sensor may be the first camera, wherein the first camera 124 may be adapted to take a first empty pocket presence image of a respective array 178 within, for example, the marking zone 146 prior to articles within the array 178 being marked by the laser marker device 126.

In certain embodiments, the reject verification sensor may be a second camera 186. The second camera 186 may further be configured to receive a second empty pocket presence image of an array 178 for comparison of the second pocket presence image to a respective first empty pocket present image of the same array previously taken by the first camera 124. Such a comparison allows the system to detect when the machine or marking process is experiencing operational discrepancies, and automatically stop the machine, indicate an alarm, or both.

Referring to FIGS. 6 and 8 for illustration, in particular embodiments, the rejection subsystem may comprise a reject block 130 having a pilot nozzle 134 and an eject nozzle 132. The reject block may be actuatable in at least two dimensions across the face of the reject zone to simultaneously position the nozzles in close proximity to a rejected article, whereat the pilot nozzle 134 is adapted to transiently blow the rejected article loose of its respective pocket 108, while the eject nozzle 132 is adapted to substantially simultaneously transiently draw in the loose rejected article 184 for conveyance to a reject bin 162. The actuation of the reject block may be effected by way of, for example, an XY stage 166.

Figure 4:
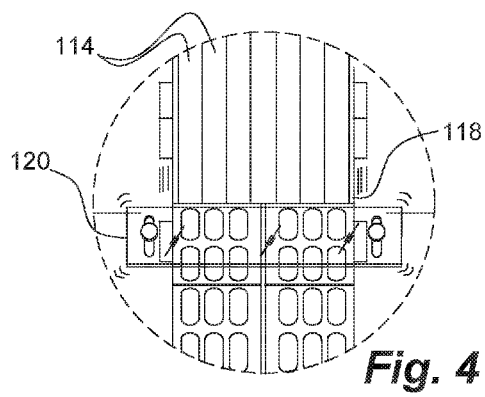
FIG. 4 is an enlarged view of detail 4 in FIG. 3.

Referring to FIGS. 4 and 7 for illustration, in certain embodiments, the feeding mechanism may include a dancing plate 120 disposed generally above an interface between the indexing wheels 104 and 106, and a curved transfer tip 118 of a feed track. The dancing plate 120 may be adapted to retainingly halt the flow of articles from the transfer tip when a respective indexing wheel is paused, and to vibrate for facilitating entry of articles into respective pockets 108 when a respective indexing wheel is rotating.

In particular embodiments, the first inspection system (which may include first camera 124) may be configured to receive a marking zone image during each period in which both indexing wheels are momentarily paused between respective incremental rotations. The marking zone image may preferably encompass the arrays 178 of each the indexing wheels which are currently positioned within the marking zone 146. The marking zone image may be adapted to provide empty pocket presence data for the array in the marking zone 146 which has yet to be marked, and marking inspection data for the array in the marking zone 146 which has been just marked. In certain such embodiments, the first inspection system 124 may be configured to receive the marking zone image every approximately 0.9 seconds, and each incremental rotation may be adapted to occur every approximately 0.9 seconds.

Referring to FIGS. 1 and 6 for illustration, certain embodiments may further comprise at least one blow-off assembly (see for example, 152 and 154) configured to direct one or more jets of gas toward the unloading zone 170 for facilitating the extraction of articles which have been marked and accepted from their respective pockets. Embodiments may also preferably comprise a blow-off verification sensor 160 for verifying that all pockets having been transported through the unloading zone 170 are empty prior to returning to the loading zone 121.

As is made apparent with the benefit of the remainder of this disclosure, a method for laser marking of individual consumable articles may comprise one or more of the following steps: providing at least two indexing wheels being substantially coaxial and having respective circumferential peripheries with a multiplicity of open pockets 108 distributed thereabout; transporting discrete arrays 178 of respective pockets 108 through at least a loading zone 121, a marking zone 146, a reject zone 128, and an unloading zone 170, by incrementally rotating the indexing wheels in alternating indexing fashion and pausing each indexing wheel after each rotation; feeding one article into each pocket transported through the loading zone by way of a feed mechanism; laser marking each article in respective pockets positioned within the marking zone 146 while the respective indexing wheel is paused; inspecting marked the articles within the marking zone by way of a first camera to determine if the marked articles are properly marked, then identifying the marked articles as rejected or accepted; removing each rejected article from respective pockets within the reject zone 128 by way of a rejection subsystem; verifying removal of each rejected article by way of a reject verification sensor 186; and collecting articles from the unloading zone 170 which have been marked and identified as accepted.

Particular embodiments of the method described directly above may further comprise the step of receiving, by way of the first camera, a marking zone image during each period in which both indexing wheels are momentarily paused between respective incremental rotations, wherein the marking zone image encompasses the arrays 178 of each indexing wheel which are positioned within the marking zone 146, and wherein the marking zone image may be adapted to provide empty pocket presence data for the array which has yet to be marked, and marking inspection data for the array which has just been marked.

Certain embodiment of the method describe above may further comprise the following steps: providing a reject block 130 having a pilot nozzle and an eject nozzle 132; actuating the reject block 130 in one or more dimensions across the reject zone 128 to simultaneously position the nozzles in close proximity to a rejected article 184; transiently blow, by way of the pilot nozzle, the rejected article 184 loose of its respective pocket 108; and transiently draw in, by way of the eject nozzle 132, the loose rejected article for conveyance to a reject bin 150.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for laser marking of individual consumable articles, the system comprising:
two indexing wheels being substantially coaxial and having respective circumferential peripheries with a multiplicity of open pockets distributed thereabout, each said pocket being configured to releasably receive an individual consumable article for substantially stabilized transport of said article with the respective said pocket, said indexing wheels configured to be incrementally rotated in alternating indexing fashion for transporting discrete arrays of respective said pockets through at least a loading zone, a marking zone, an inspection zone, a reject zone, and an unloading zone, wherein each indexing wheel is paused between respective incremental rotations, said marking zone and inspection zone being collocated;
a pair of stepper motors for providing said incremental rotations of said indexing wheels, said stepper motors being in communication with control electronics for controlling said incremental rotations;

a feeding mechanism configured to feed one of said articles into each pocket transported through said loading zone;

a laser marker device for marking said articles in respective pockets positioned within said marking zone while the respective said indexing wheel is paused;

a first inspection system by which articles that have been marked within said marking zone may be inspected for proper marking and identified as either accepted or rejected, said first inspection system being configured to receive a marking zone image during each period in which both said indexing wheels are momentarily paused between respective incremental rotations, said marking zone image encompassing a respective said array positioned within said marking zone by each said indexing wheel, wherein said marking zone image is adapted to provide pocket presence data for the positioned array which has yet to be marked on one said indexing wheel, and marking inspection data for the positioned array which has been just marked on the other said indexing wheel;

a rejection subsystem for removing each of said rejected articles from respective pockets within said reject zone;

a reject verification sensor for verifying said removing of each of said rejected articles; and a collection device configured to receive articles from said unloading zone which have been marked by said laser marker device and identified as accepted.

2. A system as defined in claim 1 in which each said circumferential periphery is comprised of a multiplicity of arcuate shoes, each said shoe being removably and replaceably secured to its respective said indexing wheel.

3. A system as defined in claim 2 in which said shoes are made substantially of acetal resin.

4. A system as defined in claim 1 in which said control electronics are re-programmable to adjust rates of rotational acceleration and rotational deceleration for said indexing wheels.

5. A system as defined in claim 1 in which said articles are pharmaceutical capsules.

6. A system as defined in claim 5 further comprising a plurality of said pharmaceutical capsules, at least an outer layer of each of said plurality of pharmaceutical capsules including an additive which absorbs laser light to result in a color change.

7. A system as defined in claim 1 further comprising an empty pocket sensor for detecting empty said pockets, wherein said system is adapted to prevent said laser marker device from directing marking energy into said empty pockets while marking articles present within the respective said array.

8. A system as defined in claim 7 in which said empty pocket sensor is said first inspection system, wherein said first inspection system is adapted to take an empty pocket presence image of a respective array within said marking zone prior to articles within said array being marked by said laser marker device.

9. A system as defined in claim 8 in which said reject verification sensor is a second camera, said second camera further being configured to receive a second empty pocket presence image of an array for comparison of said second empty pocket presence image to a respective said first empty pocket presence image of the same said array.

10. A system as defined in claim 1 in which said rejection subsystem comprises a reject block having a pilot nozzle and an eject nozzle, said reject block being actuatable in at least two dimensions across the reject zone to simultaneously position said nozzles in close proximity to a rejected article, whereat said pilot nozzle is adapted to transiently blow said rejected article loose of its respective pocket, while said eject nozzle is adapted to substantially simultaneously transiently draw in said loose rejected article for conveyance to a reject bin.

11. A system as defined in claim 1 in which said feeding mechanism includes a dancing plate disposed generally above an interface between said indexing wheels and a curved transfer tip of a feed track, said dancing plate being adapted to retainingly halt the flow of articles from said transfer tip when a respective said indexing wheel is paused, and to vibrate for facilitating entry of articles into respective pockets when a respective said indexing wheel is rotating.

12. A system as defined in claim 1 in which said first inspection system is configured to receive said marking zone image every approximately 0.9 seconds, and each said incremental rotation is adapted to occur every approximately 0.9 seconds.

13. A system as defined in claim 1 further comprising at least one blow-off assembly configured to direct one or more jets of gas toward said unloading zone for facilitating the extraction of articles which have been marked and accepted from their respective pockets.

14. A system as defined in claim 13 further comprising a blow-off verification sensor for verifying that all pockets having been transported through said unloading zone are empty prior to returning to the loading zone.

15. A system for laser marking of individual consumable articles, the system comprising:

at least two indexing wheels being substantially coaxial and having respective circumferential peripheries with a multiplicity of open pockets distributed thereabout, each said pocket being configured to releasably receive an individual consumable article for substantially stabilized transport of said article with the respective said pocket, said indexing wheels configured to be incrementally rotated in alternating indexing fashion for transporting discrete arrays of respective said pockets through at least a loading zone, a marking zone, an inspection zone, a reject zone, and an unloading zone, wherein each indexing wheel is paused between respective incremental rotations;

a pair of stepper motors for providing said incremental rotation of said indexing wheels, said stepper motors being in communication with control electronics for controlling said incremental rotation;

a feeding mechanism configured to feed one of said articles into each pocket transported through said loading zone;

a laser marker device for marking said articles in respective pockets positioned within said marking zone while the respective said indexing wheel is paused;

a first inspection system by which articles that have been marked within said marking zone may be inspected for proper marking and identified as either accepted or rejected;

a rejection subsystem for removing each of said rejected articles from respective pockets within said reject zone, said rejection subsystem comprising a reject block having a pilot nozzle and an eject nozzle, said reject block being actuatable in at least two dimensions across the reject zone to simultaneously position said nozzles in close proximity to a rejected article, whereat said pilot nozzle is adapted to transiently blow said rejected article loose of its respective pocket, while said eject nozzle is adapted to substantially simultaneously transiently draw in said loose rejected article for conveyance to a reject bin;

a reject verification sensor for verifying said removing of each of said rejected articles; and a collection device configured to receive articles from said unloading zone which have been marked by said laser marker device and identified as accepted.

\* \* \* \* \*